United States Patent [19]

Renfrew

[11] 4,391,754
[45] Jul. 5, 1983

[54] ANTHRAQUINONE COMPOUNDS
[75] Inventor: Andrew H. M. Renfrew, Bury, England
[73] Assignee: Imperial Chemical Industries PLC, London, England
[21] Appl. No.: 363,223
[22] Filed: Mar. 29, 1982

Related U.S. Application Data
[63] Continuation of Ser. No. 173,351, Jul. 29, 1980, abandoned.
[51] Int. Cl.³ .................... C07C 97/26; C07C 49/74
[52] U.S. Cl. .................................. 260/380; 260/383
[58] Field of Search .............................. 260/380, 383

[56] References Cited
U.S. PATENT DOCUMENTS

| | | | |
|---|---|---|---|
| 2,321,767 | 6/1943 | Ogilvie | 260/380 |
| 3,147,284 | 9/1964 | Rhyner | 260/380 |
| 3,502,423 | 3/1970 | Buecheler | 260/380 |
| 4,210,413 | 7/1980 | Gehrke et al. | 260/380 |
| 4,232,950 | 11/1980 | Benham | 252/299.1 |
| 4,250,102 | 2/1981 | Tzikas | 260/380 |
| 4,363,743 | 12/1982 | Moeller et al. | 260/380 |

FOREIGN PATENT DOCUMENTS

| | | | |
|---|---|---|---|
| 26004 | 4/1981 | European Pat. Off. | 252/299.1 |
| 38460 | 10/1981 | European Pat. Off. | 252/299.1 |
| 44893 | 2/1982 | European Pat. Off. | 252/299.1 |
| 48202 | 2/1982 | European Pat. Off. | 260/369 |
| 48204 | 4/1982 | European Pat. Off. | 260/383 |
| 49036 | 4/1982 | European Pat. Off. | 252/299.1 |
| 911865 | 7/1963 | France | 260/380 |
| 856553 | 12/1960 | United Kingdom | 260/383 |
| 1241601 | 8/1971 | United Kingdom | 260/383 |
| 2037803 | 7/1980 | United Kingdom | 252/299.1 |
| 2038809 | 7/1980 | United Kingdom | 260/383 |

OTHER PUBLICATIONS
*The Eighth International Liquid Crystal Conference*, Program and Abstract, J. Cognord et al., pp. 1-23, "Dichroic Dyes with Good Stability and High Order Parameter", 1980, Japan.

Primary Examiner—Delbert E. Gantz
Assistant Examiner—Raymond K. Covington
Attorney, Agent, or Firm—Cushman, Darby & Cushman

[57] ABSTRACT

Compounds of the formula:

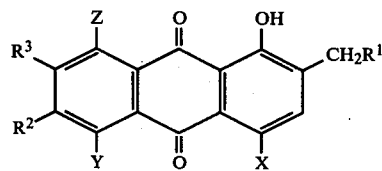

wherein
$R^1$ is alkyl or aryl;
X is H, $NH_2$ or $NHCH_3$;
one of Y and Z is OH and the other is H, $NH_2$ or $NHCH_3$; and
one of $R^2$ and $R^3$ is H and the one that is ortho to the OH group is a $-CH_2R^1$ radical.

The compounds include pleochroic dyes useful in liquid crystal display systems.

4 Claims, No Drawings

ANTHRAQUINONE COMPOUNDS

This is a continuation, of application Ser. No. 173,351 now abandoned filed July 29, 1980.

This invention relates to anthraquinone compounds and methods for their manufacture.

According to the invention, there are provided anthraquinone compounds of the formula:

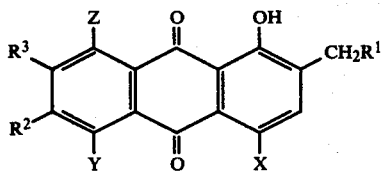

wherein
$R^1$ represents an alkyl or aryl radical;
X is H, $NH_2$ or $NHCH_3$;
one of Y and Z is OH and the other is H, $NH_2$ or $NHCH_3$; and
one of $R^2$ and $R^3$ is H and the one that is ortho to the OH group is a $-CH_2R^1$ radical.

Alkyl radicals which may be represented by $R^1$ include radicals containing from 1 to 20 carbon atoms. Those radicals containing 3 or more carbon atoms may have either straight or branched chains. Aryl radicals which may be represented by R include phenyl radicals and para-substituted phenyl radicals such as p-tolyl.

Compounds within the scope of Formula I and represented by the formula:

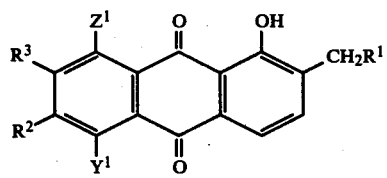

wherein one of $Y^1$ and $Z^1$ is OH and the other is H; $R^1$, $R^2$ and $R^3$ having the meanings given above, may be prepared by reacting an anthraquinone compound of the formula;

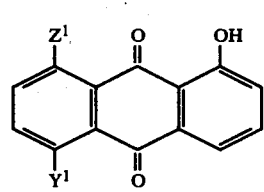

with an aliphatic or aromatic aldehyde ($R^1$CHO) in the presence of aqueous alkaline sodium dithionite. The reaction may conveniently be carried out at a temperature within the range 20° to 100° C., especially 60°-80° C., for a reaction time of from 1 to 24 hours using 2 moles of aldehyde per mole of anthraquinone compound of Formula III. The reaction product separates out from the aqueous mixture and can be collected, washed with water and dried. The reaction proceeds particularly smoothly, giving a very pure product, when the aldehyde is one that is incapable of undergoing an aldol condensation or which undergoes a retro-aldol condensation under the reaction conditions. Particularly suitable aldehydes in this respect are those in which $R^1$ is a secondary or tertiary alkyl or an aryl group.

Compounds within the scope of Formula I and represented by the formula:

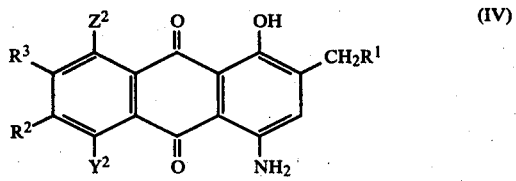

wherein one of $Y^2$ and $Z^2$ is OH and the other is $NH_2$, $R^1$, $R^2$ and $R^3$ having the meanings given above, may be prepared by nitrating a compound of Formula II, using a standard method for the anthraquinone series, to form the corresponding dinitro compound and then reducing the nitro groups by a standard method.

Compounds of the formula:

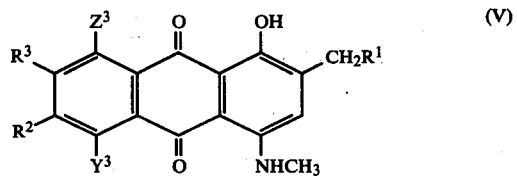

wherein one of $Y^3$ and $Z^3$ is OH and the other is $NHCH_3$, $R^1$, $R^2$ and $R^3$ having the meanings given above, may be prepared by methylating the compounds of Formula IV.

The anthraquinone compounds of Formula I are useful as dyes and/or as dyestuff intermediates. Thus, the compounds of Formula IV and Formula V have strong blue shades and are useful as dyes of the water-insoluble type and may be further reacted, if desired, to produce other dyes. As indicated above, the compounds of Formula II are useful intermediates in the production of the dyes of Formula IV and Formula V and they can also be used as yellow dyes.

In addition to their more conventional dyestuff uses, the anthraquinone compounds of the present invention are particularly suitable for use in solution with liquid crystal materials for electro-optic device applications.

Electro-optic display devices of certain known types depend upon liquid crystal properties displayed by certain compounds known as liquid crystal compounds or materials which display phases intermediate between the fully ordered crystalline state and the fully disordered liquid state, apart from certain temporary short range ordering that is present in most liquid phases.

Broadly speaking there are two principal types of liquid crystal phase, the smectic mesophase in which the molecular ordering is of a substantially lamellar type and the nematic mesophase in which the ordering is substantially linear. Included sometimes as a sub-claim of the nematic mesophase and sometimes classified as a separate mesophase is the cholesteric mesophase. This last type has a helical order arising from the presence of a chiral or optically active centre in the molecular composition of the material and this helical order is superimposed upon the linear order of the nematic mesophase.

Liquid crystal materials have the property of imposing their own ordering upon other molecules incorporated in the materials and having an appropriate molecular configuration or shape. This property is the basis of guest-host devices in which a "host" liquid crystal material has its orientation controlled by the application of electrical or magnetic fields and in turn imposes its order upon "guest" molecules of, for example, pleochroic dyes. These are dyes whose absorption properties vary with the orientation direction of the electric vector of light incident upon them relative to their own molecular alignment. A suitable pleochroic dye has an elongated rod-like molecule which absorbs relatively little light passing along its longitudinal axis but has a maximum absorption of light having its electric vector oriented along the longitudinal axis of the molecule.

Such dye molecules when placed in a liquid crystal material can adopt an orientation which follows the molecular orientation given to the crystal material and, taking advantage of this, two broad classes of guest-host devices are possible based respectively upon a nematic (or Freedericksz effect) device and secondly upon a cholesteric to nematic phase-change device.

In a nematic device the liquid crystal material is originally oriented by known treatment of the inner surfaces of the container, e.g. glass plates bearing device electrodes, containing the liquid crystal material. This orientation is changed by application of an electric field between the device electrodes. The guest dye material also changes its orientation resulting in a change in absorption of light passing along the axis of the electrical field giving a switchable electro-optical display.

In a cholesteric-to-nematic phase change device the liquid crystal material has positive dielectric anisotropy and is or includes an optically active compound which causes the material to exhibit a cholesteric mesophase having a long-pitch helical ordering of short range (the "focal conic" state). In the "off" state the device scatters incident light because the ordering is only short range. However when the device is switched on the electrical field applied across the material imposes a linear nematic order parallel to the electric field which results in orientation of any guest dye molecules also parallel to the electrical field and provides minimum absorption in that direction. Thus in the "on" state the device is less scattering and a switchable display is obtained between the "on" and "off" states. The dye enhances the contrast between the two states.

In order to provide maximum contrast between the two states it is important that the guest molecules adopt as closely as possible the time averaged orientation of the host, however this is achieved only to a limited degree because of random thermal fluctuations. The degree to which the orientation varies from the ideal is measured by a quantity known as the order parameter S which is given by the following equation:

$$S = \tfrac{1}{2}(3\cos^2\theta - 1)$$

where $\cos^2\theta$ is a time averaged term and $\theta$ is the instantaneous angular orientation of the molecules with respect to the time averaged orientation of the host molecules. The determination of the value of the order parameter S is well understood in the art see for example the paper "A new absorptive mode reflective liquid crystal display device" by D. L. White and G. N. Taylor in the Journal of Applied Physics, 1974, 45, pages 4718 to 4723.

For perfect orientation the order parameter S is one (that is $\theta$ is zero) and pleochroic dyes for use in guest host devices should have an order parameter in the liquid crystal host as near one as possible but they must also have adequate chemical, photochemical and electrochemical stability, e.g. stability when exposed to atmospheric contaminants, electric fields (as in device operation) and to ultra-violet radiation. They should not be ionic or have any ionisable character and must also have sufficient solubility in the host materials although the concentrations of guest pleochroic dye required for the desired effect are generally quite small. The concentration is normally selected to ensure a light absorbance in the range of about 1.0 to 1.2 in the absorbing state of the cell, and of course depends upon the cell thickness and the absorption coefficient of the dye. Typically this gives concentrations of pleochroic dye of up to about 1% by weight of the host material.

Although a vast number of dyes are known only a relatively very small proportion of these would be of any practical utility in liquid crystal applications because only a very small proportion are for instance pleochroic, non-ionic and sufficiently soluble and capable of aligning in liquid crystal material.

Certain anthraquinone dyes have been proposed for use in conjunction with liquid crystal materials in UK Patent Application No. GB 2024844A but in general these do not have the desired combination of properties set out above.

Whilst all the anthraquinone compounds of Formula I are useful to some extent in liquid crystal compositions, the preferred compounds are those of Formula IV because of their high order parameters, excellent stability to light and solubility characteristics. Particularly suitable compounds are those of Formula IV wherein $R^1$ represents an alkyl radical containing from 2 to 9 carbon atoms. Examples of especially suitable compounds are 4,5-diamino-2,7-di-isobutyl-1,8-dihydroxyanthraquinone and 4,8-diamino-2,6-di-isobutyl-1,5-dihydroxyanthraquinone.

For use in liquid crystal systems, the anthraquinone compounds of the invention should be in a state of very high purity. Purification may be effected using conventional methods such as recrystallisation from suitable solvents and chromatography.

To obtain particular colour effects in liquid crystal systems, the dyes of the invention may be used singly or in the form of mixtures. Alternatively, one or more compounds of Formula I may be used in admixture with other pleochroic dyes. Thus, for example, a blue dye of Formula IV, may be used in admixture with one or more other pleochroic dyes, for example, a yellow and-/or a red dye.

The invention is illustrated but not limited by the following Examples in which all parts and percentages are by weight.

EXAMPLE 1

1,8-Dihydroxyanthraquinone (36 parts) is added to water (500 parts) with stirring under nitrogen at room temperature followed by sodium hydroxide (36 parts) and sodium dithionite (65 parts) and the temperature is raised to 50° C. Iso-butyraldehyde (35.6 parts) is then added and the temperature is raised to 70°–80° C. over 2 hours and maintained for a further 18 hours. The reaction mixture is cooled and the solid is filtered off, washed in turn with water (250 parts), 3% hydrochloric acid (250 parts) and finally water until acid-free (500 parts) and dried in an air oven giving 51.5 parts of product. One crystallisation from ethyl acetate (or glacial acetic acid) gives yellow needles of 2,7-di-isobutyl-1,8-dihydroxyanthraquinone, m.p. 138°–140° C.

20% Oleum (230 parts) is added to concentrated sulphuric acid (180 parts) followed by boric acid (30 parts), the temperature rising to about 70° C. The mixture is stirred at 60°–70° C. for 30 minutes to dissolve the solid and cooled to 50° C. 2,7-Di-isobutyl-1,8-dihydroxy anthraquinone (60 parts) is then added portionwise and after 1 hour at 20°–30° C., 100 parts of a 25/75 mixture of concentrated nitric acid and concentrated sulphuric acid are added. The reaction mixture is stirred at room temperature for 2 hours and then drowned into water. The solid is collected, washed with water until acid-free and dried in an air oven giving 66.5 parts of product. Crystallisation from dioxan gives 2,7-di-isobutyl-1,8-dihydroxy-4,5-dinitroanthraquinone m.p. 250°–252° C.

A slurry of the above dinitro compound (40 parts) in water (600 parts) is treated with sodium sulphide crystals (80 parts) and the mixture is stirred at 90° C. for 3–4 hours. The reaction mixture is filtered and the collected solid is well washed with water and dried in an air oven giving 31 parts of 4,5-diamino-2,7-di-isobutyl-1,8-dihydroxy anthraquinone. Two crystallisations from isopropanol give black needles m.p. 198°–200° C. Two further crystallisations from toluene give black needles m.p. 200°–201° C. of 98–99% purity by HPLC.

The pure product has a very high order parameter when measured in a liquid crystal mixture comprising 4-n-pentyl-4′-cyanobiphenyl: 51%
4-n-heptyl-4′-cyanobiphenyl: 25%
4-n-octyloxy-4′-cyanobiphenyl: 16%
4-n-pentyl-4″-cyanoterphenyl: 8%

EXAMPLE 2

The procedure of Example 1 is followed using 1,5-dihydroxyanthraquinone in place of the 1,8-isomer. The initially formed 2,6-di-isobutyl-1,5-dihydroxyanthraquinone (m.p. 188° C.) after nitration and reduction gives 4,8-diamino-2,6-di-isobutyl-1,5-dihydroxyanthraquinone, m.p. 286°–288° C.

The purified product has a very high order parameter when measured in the liquid crystal mixture described in Example 1.

EXAMPLE 3

The procedure of Example 1 is followed using 59 parts of nonaldehyde in place of the 35.6 parts of iso-butyraldehyde.

The 4,5-diamino-2,7-dinonyl-1,8-dihydroxy anthraquinone has a very high order parameter when measured in the liquid crystal mixture described in Example 1.

EXAMPLE 4

The procedure of Example 1 is followed using 24 parts of propionaldehyde in place of the 35.6 parts of iso-butyraldehyde. The product is 4,5-diamino-2,7-dipropyl-1,8-dihydroxyanthraquinone.

EXAMPLE 5

The procedure of Example 1 is followed using 76 parts of dodecanal in place of the 35.6 parts of iso-butyraldehyde. The product is 4,5-diamino-2,7-didodecyl-1,8-dihydroxyanthraquinone.

EXAMPLE 6

The product of Example 1 is methylated using dimethyl sulphate in sulphuric acid to give 4,5-bis(methylamino)-2,7-di-isobutyl-1,8-dihydroxyanthraquinone.

I claim:
1. An anthraquinone compound of the formula:

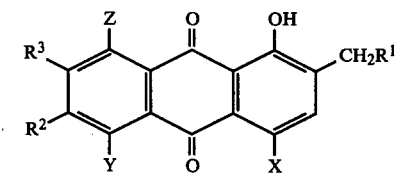

wherein
$R^1$ represents an alkyl radical containing from 1 to 20 carbon atoms;
X is H, $NH_2$ or $NHCH_3$;
one of Y and Z is OH and the other is H, $NH_2$ or $NHCH_3$; and
one of $R^2$ and $R^3$ is H and the one that is ortho to the OH group is a —$CH_2R^1$ radical.

2. An anthraquinone compound as claimed in claim 1 having the formula:

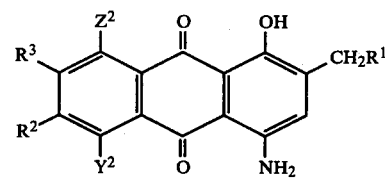

wherein $R^1$ is an alkyl radical containing from 2 to 9 carbon atoms and one of $Y^2$ and $Z^2$ is OH and the other is $NH_2$.

3. An anthraquinone compound as claimed in claim 2 having the formula:

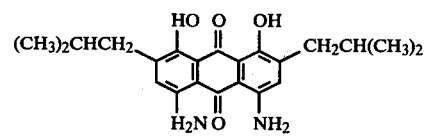

4. An anthraquinone compound as claimed in claim 2 having the formula:

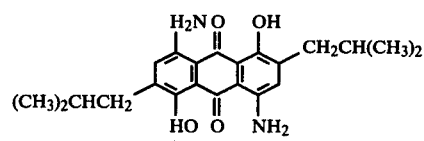

* * * * *